Jan. 17, 1956 H. R. SODERSTROM 2,731,278
SELF-SEALING RELEASABLE COUPLING
Filed June 9, 1953

Harry R. Soderstrom
INVENTOR.

BY James M. Clark

HIS PATENT ATTORNEY.

United States Patent Office 2,731,278
Patented Jan. 17, 1956

2,731,278

SELF-SEALING RELEASABLE COUPLING

Harry R. Soderstrom, Wichita, Kans., assignor to Boeing Airplane Company, a corporation of Delaware Application June 9, 1953, Serial No. 360,518

3 Claims. (Cl. 284—19)

The present invention relates to valved-type joints and couplings and more particularly to improvements in self-aligning, self-centering and self-sealing quickly releasable valved couplings.

The present application is a continuation-in-part of my co-pending application Serial No. 152,279, filed March 28, 1950, now abandoned, for a Self-Sealing Releasable Coupling.

This invention is directed to an improved valved coupling arrangement having features which insure its alignment upon engagement of the coupling halves as well as the automatic opening of the valve portion upon engagement of the coupling halves. It is also directed to a coupling which is self-closing or self-sealing when the coupling halves are again released or separated. While this improved coupling assembly enjoys general applicability to numerous installations within conduits or other piping systems and for connections to fluid containers, it is particularly adapted for use in the attachment of droppable tanks to the wings or other portions of aircraft.

The improved coupling of this invention consists essentially of a first rigid coupling half which houses the valve or self-sealing elements, and includes a lip or skirt portion which is sealed against the engaging terminal of the second flexible coupling half. In the case of an aircraft drop tank, the first coupling half would be retained and the second half expended or released with the tank. The movable valve element is provided with a central depression engageable by a centering rod or like element which is spring-biased within, and rockably guided for axial movement by the flexible coupling half. The flexibility of the coupling half is preferably derived from a bellows conduit portion and the engaging elements of both halves eliminate the necessity for exact alignment either axially, angularly or rotationally. The arrangement of the parts is also such that upon engagement the coupling becomes positively sealed prior to the time that its valve is automatically opened; and upon initiation of the separation of the coupling halves, the valve is self-closing or self-sealing prior to the physical separation of the coupling halves. The arrangement of the valved coupling is such that all clamps, bolts and screws are eliminated and in the case of a droppable fuel tank the coupling halves are maintained in their operative positions by the customary suspension means for supporting the droppable tank. It is also such that the seal between the halves, and the seating of the valve when the coupling halves are separated, are both made solely by the pressure of the springs carried within the respective coupling halves, other than the tank supports.

It is, accordingly, a major object of the present invention to provide an improved quick-releasable valved pipe joint or coupling which is simple, foolproof and easily operated. It is a further object to provide such a coupling which is self-alignable, or self-centering, and self-sealable and eliminates the necessity for exact alignment either axially, laterally or angularly with respect to the axis. It is a corollary object of this invention to provide an improved self-aligning, self-sealing coupling in which a sealed engagement of the coupling halves may be readily made without the necessity of precise alignment, and in which the valve portion automatically opens to permit immediate flow through the engaged coupling portions. It is a further object to provide spring-biasing means for automatically closing the valve of the valved coupling half in a fluid-tight relationship immediately before the coupling halves are separated.

A further object resides in providing an improved coupling for droppable tanks for aircraft in which the seals are made solely by spring pressure which assists in the release of the coupling and in which the coupling halves may be readily maintained in their engaged operative relationship by existing or other suitable attachment means provided for the tank support without the necessity of supplementary bolts, clamps, attachment screws or the like. A further object lies in providing an expendable coupling half which is simple, economical in cost and easy to replace. Still further objects of the present invention reside in the improved relationship of the respective elements comprising the coupling as well as in the specific details of the several parts.

Other objects and advantages of the present invention will become apparent to those skilled in the art after reading the following description when considered in conjunction with the accompanying drawings, forming a part hereof, in which.

Figure 1:
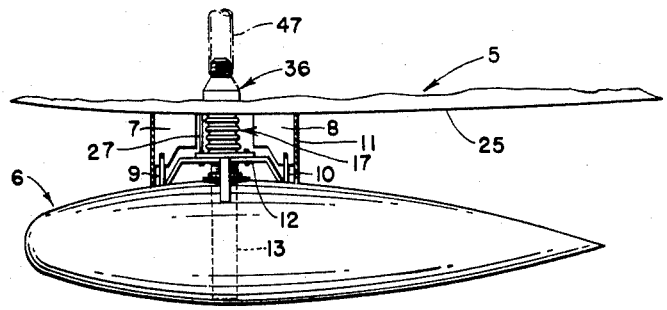
Fig. 1 is a preferred form of the self-sealing releasable coupling as applied to a droppable tank suspended from the wing of an aircraft.

Referring now to Fig. 1, the numeral 5 represents the wing of an aircraft of which only the bottom portion is indicated and from which the droppable fuel tank 6 is releasably suspended. Such droppable tanks are preferably of tear drop or streamline form to materially reduce their drag during flight and are usually suspended, similar to aerial bombs, from suitable supporting shackles 7 and 8 fixedly attached to the structure of the wing 5 by means of the supporting hooks or eyes 9 and 10 which are attached to the wing structure, being streamlined in plan form, to enclose the supporting structure and releasing mechanism for the jettisonable tank as well as to shield the coupling means. The fairing 11 is preferably open at its bottom and its lower edges are preferably contoured such that it engages the curved surfaces of the drop tank 6 in a continuously sealed and well-faired manner to prevent undue resistance at the juncture of the upper wall of the tank 6 and the lower edge of the fairing.

The tank 6 preferably has welded, or otherwise attached, to its shell the yoke structure 12, and has a standpipe 13 extending from adjacent the tank bottom vertically up through the top of the tank to a threaded connection with the nipple 14. Where the pipe 13 passes through the top shell of the tank 6 it is threadedly attached to a saddle flange 13a which in turn is secured to the tank shell. The nipple 14 is press fitted into the flange 15 which is secured by the bolts 16 to the drop tank yoke 12. The nipple 14 has secured to its upper end the bellows type spring metal flexible tubing 17 which, by virtue of its connection to the nipple 14 and the flanges 13a and 15, is therefore rigidly attached at its lower end to the drop tank 6. A spider 18, having a central opening 18a, is secured within the top portion of the nipple 14 and a similar spider 19, having a central opening 19a, is fixedly supported within the upper terminal of the flexible tubing portion of the coupling 17.

Figure 3:
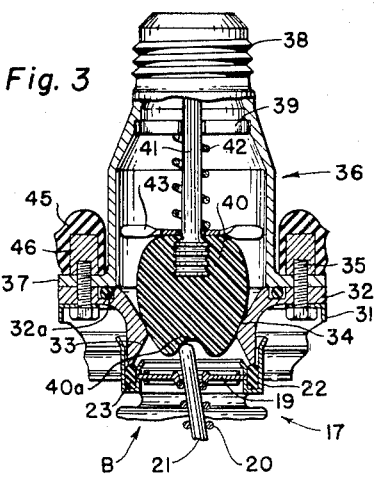
Fig. 3 is a further view of the coupling shown in Fig. 2 with the lower flexible coupling half in both a misaligned and a tilted relationship with respect to the fixed valved portion of the coupling.
Figure 4:
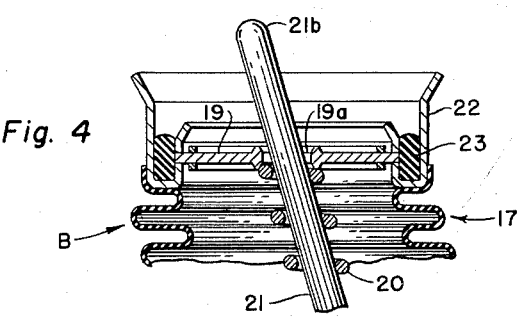
Fig. 4 is an enlarged sectional view of the end seal and valve actuator of the lower coupling half.
Figure 5:
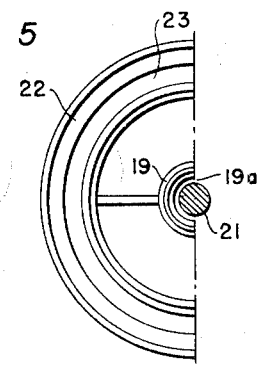
Fig. 5 is a partial plan view of the same.

The hub portions of the spiders 18 and 19 are provided with the enlarged central openings 18a and 19a such that they freely guidingly support the rod 21 in the approximately central axial position within the tubing 17. The rod 21 has shrunk or otherwise fastened onto its lower terminal the spring seat washer 21a which bears downwardly against the lower spider 18, and the upper terminal of the rod 21 is slidably guided and angularly rockable through the central hub portion of the upper spider 19, to thereby permit adequate lateral freedom of the flexible tube 17 in order that it provide automatic self-alignment of its upper seal guide 22—23 with respect to the depending lip 33 of the valve body. A compression spring 20 is interposed between the hub portions of the respective spiders 18 and 19 tending to extend or expand the flexible bellows or tubing such that when the bellows is free and uncompressed the upper end of the rod 21 is substantially flush or extends only slightly beyond the collar 22. The openings 18a and 19a in the spiders 18 and 19 provide sufficient clearance around the rod 21 such that the latter may be rocked or tilted at appreciable angles with respect to the bellows or lower half tubing 17 and the bellows tubing may move laterally with respect to the rod 21. This collar 22 has a flared mouth and forms a guide at the upper terminal of the flexible tubing 17, as shown in Figs. 3, 4 and 5, to aid in positioning the rubber end seal 23 disposed within the seal guide 22 adjacent the periphery of the upper spider 19. The detailed structure described to this point starting with the nipple 14 and including the end seal 23 comprises the lower removable and flexible half of the coupling which is expended with the released tank.

Figure 2:
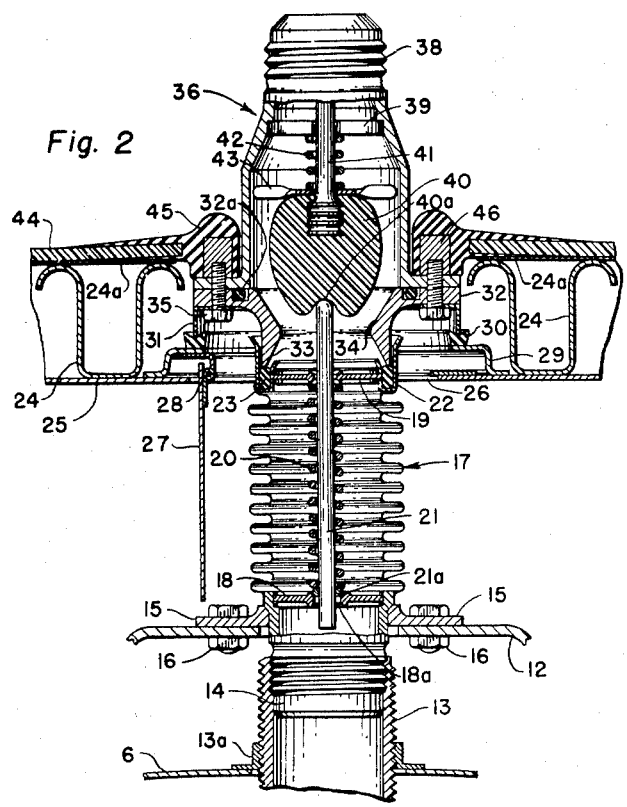
Fig. 2 is an enlarged cross-sectional view of the improved coupling shown in Fig. 1 in the engaged position.

In the preferred modification which has been shown in the drawings, the present improved coupling provides for fluid intercommunication through the bottom wall of a wing tank supported within the wing 5. The internal supporting structure may comprise the hat-shaped channels 24 to the upper flanges of which are attached the tank bottom reinforcing for the inner skin 24a, and the lower or outer wing skin 25 is suitably attached to the lower web portions of the channels 24. A circular opening 26 is coaxially disposed about the vertical axis of the coupling and a cover plate or door 27 is hinged at 28 such that it may be swung from the full line opened position of Fig. 2 to a closed position in which it is flush with the lower skin 25 of the wing.

To the inner side of the lower skin 25 there is fixedly attached a circular offset flange 29, also coaxially mounted about the vertical axis of the coupling, and which is provided on its upper surface with a further rubber seal 30. A flanged ring 31 having an annular depending lip is disposed such that the lower periphery of the lip engages the rubber ring 30 to provide a seal against fuel or other vapors entering the structure between the inner and outer skins 24a and 25. A flanged valve seat member 32 is disposed above the flanged ring 31 and also has a downwardly extending lip or coupling seat which is disposed such that it engages the rubber end seal ring 23 of the lower coupling half. The valve seat member 32 also has an upwardly facing frusto-conical valve seat portion 34 which is arranged to be engaged by the rubber valve member 40 for sealing off the flow axially through the coupling. It will be understood that the end seal provided between the rubber ring 23 and the annular lip 33 is the seal between the coupling halves and prevents leakage radially outwardly from the pipe or conduit formed by the coupling portions. The flange of the valve seat member 32 is provided with an annular groove within which is disposed the O-ring seal 32a, and the flanged lip ring 31 as well as the flange of the valve seat member 32, are attached by a plurality of screws 35 to the bottom flange of the valve body or casing 36 in such manner that the joint between the flanges of the members 32 and 36 is sealed by the O-ring 32a. The upper terminal of the valve body 36 may be suitably threaded as at 38 for connection to a pipe or conduit, such as indicated in construction lines at 47 in Fig. 1.

Within the valve body 36, there is provided an upper spider 39 which is fixedly attached to the valve body wall and is provided with a central hub portion arranged to guide the rod 41 to the lower end of which is attached the above-mentioned valve element 40. The lower portion of the valve body 36 is preferably cylindrical or of a constant diameter, and adjacent the upper surface of the valve element 40, there is disposed a floating spider 43 which is provided with rounded ends arranged to slide vertically along the cylindrical portion of the wall of the valve body 36. Between the upper spider 39, and the lower or floating spider 43, and concentrically disposed about the rod 41, is a compression spring 42 which continually urges the valve element 40 into its lowermost closed or sealed position in contact with the frusto-conical seat surface 34. The present tank is disclosed as of the flexible fuel cell type which may have a laminated plastic wall 44 terminating in an enlarged ring 45 concentrically disposed about the valve axis. The enlarged ring 45 of the fuel cell wall is provided with an annular steel insert of rectangular cross-section which is suitably tapped to receive the above-mentioned screws 35 which serve to assemble the several elements comprising the fixed coupling portion containing the self-sealing or self-closing valve means. The valve member 40 is provided with a central indentation 40a at its lower portion which is adapted to be engaged by the rounded tip 21b of the rod 21 of the flexible coupling half.

In the installation which has been shown in Fig. 1, it will be understood that the emergency fuel or liquid supply contained within the droppable tank 6 may be discharged upwardly through the stand pipe 13 (by means of a suitable booster pump contained within the drop tank or it may be drawn upwardly by a suction pump disposed within the aircraft) the fluid passing upwardly through the stand pipe 13, the lower and upper halves 17 and 36, respectively, of the coupling, and thence into the main fuel manifold and fuel system of the aircraft through the conduit indicated at 47. The fuel may then be distributed to any one of a number of fuel cells or tanks, similar to that which has been indicated in the drawings, and of which the fuel storage system of the aircraft may contain several. It will be understood, however, that the improved coupling of the present invention is not limited to such fuel systems where the fluid is required to be passed from the drop tank entirely through a wing tank but may be of an open type body 36 in which the fuel could be pumped upwardly through a suitable check valve to prevent return flow and through the open end of the valve body and thence into the tank to the bottom of which the valved coupling is attached.

The operation of the improved self-sealing releasable coupling is as follows: With the door 27 opened, the drop tank 6 is raised into position such that the axis of the lower coupling half is disposed beneath the axis of the upper coupling half as nearly as can be arranged. Let us assume now that the drop tank 6 has been tilted and moved away from its aligned position shown in Fig. 2 such that when the flexible coupling half 17 engages the fixed coupling half 36, it is in the position shown at B in Fig. 3, in which the axis of the rod 21 is tilted with respect to the fixed axis of the rod 41. Due to the clearance opening 19a between the rod 21 and the spider 19, the bellows 17 is free to align itself with the axis of the upper half, as shown in this figure despite the angularity of its general axis and the tilt of the rod 21. The guide collar 22, however, having an upper flared mouth portion, is centered by the depending lips 33 such that the lips are forced downwardly within the guide collar 22 to engage the end seal ring 23. As this occurs, the upper terminal 21b of the rod 21 engages the recess 40a at the lower end of the valve element 40 tending to center itself within the recess. From the position shown at B in Fig. 3, the drop tank 6 may then be lifted such that its hooks 9 and 10 engage the wing support shackles 7 and 8. In actual tests of a working model with the two spiders in non-alignment as shown in this figure the upper spider 19 and the associated seal assembly 22—23 seated leak-tight before the valve 40 was opened by the rod 21. As the flexible bellows 17 and its spring 20 is compressed or collapsed, due to the fixed abutment 21a the upper end of the rod 21 projects further beyond the mouth of the guide 22 and the valve element 40 is caused to be lifted from its seat 34. This establishes a positive compression seal as well as direct fluid communication between the emergency storage within the drop tank 6 and the conduit 47 extending through the wing tank to the manifolds and the pump within the aircraft.

After the contents of the drop tank 6 have been delivered upwardly through the coupling 17—36 and into the fuel system through the conduit 47, and when it is desired to jettison the drop tank 6, the mechanism for the release of the hooks 9 and 10 from the shackles 7 and 8 is operated in a conventional and well known manner and the tank 6 is then free to fall away from beneath the wing 5 of the aircraft. As the tank 6 begins to fall, the bellows 17 expands under the influence of the spring 20 to follow the falling tank, and the upper end of the rod 21 falls at the same rate as the tank. However, the guide collar 22 will remain about the lip 33 momentarily after the valve element 40 has been permitted to return under the influence of the spring 42 to its sealed or closed position and the expanding bellows thereafter disengages the end seal at 23.

Although the foregoing description was based on use of the improved quick release coupling with a fuel tank, it will be equally useful for oil or other fluids or as a vent connection. When used with fuel and oil it is desirable that the plastic and rubber parts of the coupling comprising the seals and the valve element, be of a composition which is not adversely affected by these fluids. While the preferred modification is for a drop tank fuel connection it will be appreciated that the coupling is also adapted as an under-wing fueling coupling and for other positions than at the bottom of a tank. It will be recognized that it is of a simplified foolproof construction which insures against fouling when released and is not entirely dependent upon the weight of the falling tank as the two springs aid in separating the tank from the aircraft after the release mechanism 7—8 and 9—10 is tripped for jettisoning.

Other forms and modifications of the present invention, which will occur to those skilled in the art after reading the foregoing description, are intended to come within the scope and spirit of this invention as more particularly set forth in the appended claims.

I claim:

1. In a self-aligning flexible coupling assembly comprising a fixed coupling portion and a flexible coupling portion subject to being brought together with angularly misaligned axes; said fixed coupling portion having an annular end seal, a valve element operatively carried by said fixed coupling portion; said flexible coupling portion having an axially compressible bellows with a relatively fixed end and a relatively free end, said flexible coupling portion having an annular end seal formed at said free end arranged for mating and sealing fluid-tight engagement against said annular end seal of said fixed coupling portion, said flexible coupling portion carrying a first spider element having a central guide aperture carried by the relatively free end thereof, said flexible coupling portion carrying a second spider element having a central guide and support aperture carried by the relatively fixed end thereof, rod-like valve actuating means slidably and rockably associated in a centrally disposed relationship within the guide aperture of said first spider element, said actuating means having a shoulder engaging the said support aperture in said second spider element arranged to rockably support said actuating means while limiting relative axial movement with respect to said second spider element, resilient means interposed between said first spider element and said shoulder for maintaining said flexible coupling portion in an extended condition with said shoulder against said second spider element, said flexible coupling portion and said actuating means being unrestrained in the lateral sense about their normal central axis at said free end thereof and arranged when angularly misaligned for engagement of said annular end seal of said flexible coupling portion with said annular end seal of said fixed coupling portion accompanied by axial compression of said bellows and the self-aligning engagement of said actuating means with said valve element for the unseating thereof upon said axial compression of said bellows to a predetermined extent.

2. A self-aligning flexible coupling assembly of the type called for by claim 1 characterized by the said bellows being laterally unrestrained in the sense that the respective axes of its fixed and free ends may be materially offset and the said rockable engagement of said shoulder with said support aperture in said second spider element permits relatively large angularity of said valve actuating means with the normal transverse planes of each of said spider elements whereby said assembly operates under misaligned conditions.

3. A self-aligning flexible coupling assembly of the type called for by claim 1 characterized by said valve element of said fixed coupling portion being provided with a rounded tapering recess and the terminal of said valve actuating means having a rounded contact portion whereby at materially offset positions of the fixed and free ends of said flexible coupling portion at which said valve actuating means assumes a relatively large angularity with respect to the plane of engagement of said annular end seals by virtue of the slidable and rockable relationship with said first spider element said rounded contact portion of said valve actuating means is adapted to engage the rounded tapering recess of said valve element for the opening thereof.

References Cited in the file of this patent

UNITED STATES PATENTS

| | | |
|---|---|---|
| 1,516,851 | Gregg | Nov. 25, 1924 |
| 2,485,006 | Main et al. | Oct. 18, 1949 |
| 2,588,329 | Sillers | Mar. 4, 1952 |

FOREIGN PATENTS

| | | |
|---|---|---|
| 210,032 | Great Britain | Jan. 21, 1924 |
| 835,379 | Germany | Mar. 31, 1952 |
| 865,201 | France | Feb. 17, 1941 |